US008620296B2

(12) United States Patent
Gravino et al.

(10) Patent No.: US 8,620,296 B2
(45) Date of Patent: Dec. 31, 2013

(54) INTEGRATION OF CONTACT INFORMATION ACROSS MULTIPLE COMMUNICATION DEVICES

(75) Inventors: Douglas David Gravino, Roswell, GA (US); Radhakrishnan Gopinath, Alpharetta, GA (US); Michael Lee Poffenberger, Sandy Springs, GA (US)

(73) Assignee: Cox Communications, Inc., Atlanta, GA (US)

( * ) Notice: Subject to any disclaimer, the term of this patent is extended or adjusted under 35 U.S.C. 154(b) by 543 days.

(21) Appl. No.: 12/879,207

(22) Filed: Sep. 10, 2010

(65) Prior Publication Data
US 2012/0063585 A1 Mar. 15, 2012

(51) Int. Cl.
*H04M 3/00* (2006.01)
*H04M 1/56* (2006.01)

(52) U.S. Cl.
USPC ..................... 455/418; 379/142.04

(58) Field of Classification Search
USPC .......... 455/412.2, 418, 566, 450; 379/142.04, 379/201.12; 707/705
See application file for complete search history.

(56) References Cited

U.S. PATENT DOCUMENTS

| 7,375,730 | B2* | 5/2008 | Tagliabue et al. ............. 345/581 |
| 7,797,293 | B2* | 9/2010 | Pabla et al. .................... 707/705 |
| 2006/0035632 | A1* | 2/2006 | Sorvari et al. ................. 455/418 |
| 2007/0035513 | A1* | 2/2007 | Sherrard et al. .............. 345/157 |
| 2008/0153503 | A1* | 6/2008 | Birla et al. .................... 455/450 |
| 2008/0208812 | A1* | 8/2008 | Quoc et al. ........................ 707/3 |
| 2009/0300010 | A1* | 12/2009 | Ratnakar ............................ 707/5 |
| 2010/0062753 | A1* | 3/2010 | Wen et al. ...................... 455/418 |
| 2010/0106781 | A1* | 4/2010 | Gupta ............................ 709/206 |
| 2011/0059733 | A1* | 3/2011 | Kim et al. ...................... 455/418 |
| 2011/0099019 | A1* | 4/2011 | Zopf ............................... 704/500 |
| 2011/0194679 | A1* | 8/2011 | Patisaul et al. ........... 379/142.04 |
| 2011/0286591 | A1* | 11/2011 | Fulton et al. ............. 379/201.12 |
| 2012/0069981 | A1* | 3/2012 | Hillier et al. ............. 379/201.01 |

* cited by examiner

*Primary Examiner* — Mohammad Islam
(74) *Attorney, Agent, or Firm* — Benjamin A. Baiser; Baiser & Grell IP Law

(57) ABSTRACT

Automatically created and dynamically updated lists of a user's frequently called contacts and favorite calling numbers may be provided via a frequently called contacts and favorite calling numbers application. If a call usage count associated with a particular phone number meets a prescribed threshold, the phone number may be added to a frequently called contacts list. Given a user's call frequency and type, the frequently called contacts list may be updated dynamically. A favorite calling numbers list may be generated manually or automatically based on various criteria for adding contact numbers to the list. Both the frequently called contacts list and the favorite calling numbers list may be tied in with a service provider's billing system, wherein special rates or discounts may be applied to calls made to or received from phone numbers in the frequently called contacts list or favorite calling numbers list.

20 Claims, 4 Drawing Sheets

INTEGRATION OF CONTACT INFORMATION ACROSS MULTIPLE COMMUNICATION DEVICES

BACKGROUND

Most wireless communication service providers provide various calling plans and features for those people whom a user calls or communicates with most often. Most mobile communication devices have various features for management of and easy access to frequently used numbers and contacts. For example, a speed dialing feature may allow for a user to associate a contact's phone number with each of the ten keys of the keypad. Another example is a favorites list feature, which may allow a user to create a list of frequently called phone numbers or favorite phone numbers, wherein the user may simply select the name of the person he/she wants to call from the list, and the call is placed.

Some service providers may provide various plans that may allow a "top X contacts" type feature or the like, wherein a user may group together several phone numbers, and wherein the user may receive pricing benefits or the like for calls made to or received from phone numbers associated with the group. While such a feature offers users some benefits, it is a manual process to enter contact information and to assign the contact information to a list or speed dial number. It is also a manual and static process to select numbers for a top X contacts-type feature. For example, a user's calling patterns may change, and a phone number he/she may have designated as a top X calling contact, or the like, may no longer be a phone number that he/she calls regularly or that is now considered a favorite number. To add or change a phone number in a user's top X contacts list, or the like, the user may have to manually change his/her list or may have to contact his/her service provider (if the service provider allows for changes to be made to the list).

It is with respect to these and other considerations that the present invention has been made.

SUMMARY

Consistent with embodiments of the present invention, systems and methods are disclosed for automatically generating a frequently called contacts list based on a user's calling patterns and for generating a favorite calling numbers list.

According to one embodiment, a frequently called contacts list may be utilized as a speed dial feature, or as a billing feature. When used as a billing feature, minute or rate discounts may be applied to communications made to or received from numbers in a user's frequently called contacts list. Because the list may be automatically generated based on a user's calling patterns, the list may be dynamic, and may provide a useful, convenient, and money-saving tool for users. A set of frequently called contacts (e.g., for either billing purposes or for purposes of setting easy/fast dialing lists) may be determined algorithmically and may be based on a number of different calling parameters such as a number of calls to particular number, minutes of calling to a particular number, calls made to a particular number during over a specified time interval, and the like. The frequently called contacts list may be updated and/or modified on a dynamic, periodic basis (e.g., daily, monthly, annually) based on these types of calling patterns. Generation of, access to and maintenance of the frequently called contacts list may be done locally on a local device (e.g., a wireless telephone), or generation of, access to and maintenance of the frequently called contacts list may take place remotely, for example, at a network-based call control center or billing system center.

According to another embodiment, a favorite calling numbers list may be generated which may contain frequently called contacts, or which may contain other numbers that are not called on a particular frequency, but that are otherwise important to the user. The favorite calling numbers list may be a subset of a larger contacts list typically managed by the user (including the frequently called contacts list discussed above), and the favorite calling numbers list may be used and/or synchronized on a variety of platforms and places for a variety of actions. As with the frequently called contacts list, described above, the favorite calling numbers list may be maintained locally on the local communication device and/or remotely at a network-based call control or billing system center. If the favorite calling numbers list is maintained both locally and remotely, periodic communication may be performed between the local device and the remote network-based center for synchronizing the maintenance of the favorite calling numbers. The favorite calling numbers list may be a subset of the above-described frequently called contacts list where the frequently called contacts list may be utilized to build the favorite calling numbers list either manually or automatically.

Both the frequently called contacts list and the favorite calling numbers list may be tied in with a service provider's billing system, wherein special rates or discounts may be applied to calls made to or received from phone numbers in the frequently called contacts list or favorite calling numbers list.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Figure 1:
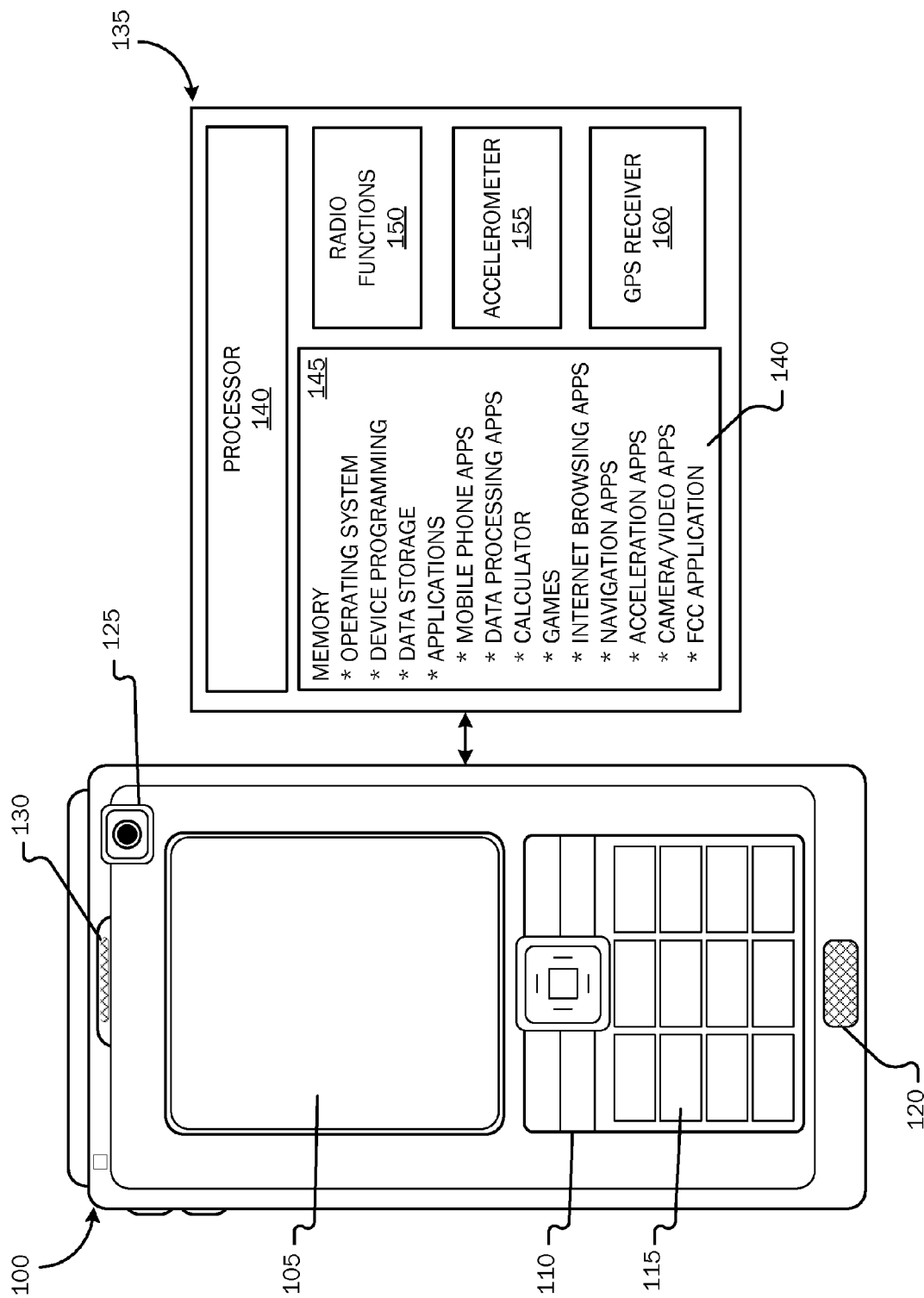
FIG. 1 is a simplified block diagram of a communication device with which embodiments of the invention may be implemented.

As briefly described above, embodiments of the present invention provide for automatically creating and dynamically updating a list of a user's frequently called contacts from retrieved call usage data associated with one or more called phone numbers and for generating and maintaining a favorite calling numbers list. The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

FIG. 1 is a block diagram of a mobile computing device (i.e., communication device) with which embodiments of the present invention may be practiced. The term "communication device" will herein be used for convenience and may also be used to describe a computing device operative to send, receive and process communications according to embodiments of the present invention. The communication device 100 is illustrative of any suitable device, such as a mobile telephone, personal digital assistant (PDA), tablet computer, or handheld computer, operative to send, receive and process wireless communications according to embodiments of the present invention. A display screen 105 is operative for displaying a variety of information such as information about incoming and outgoing communications, as well as, a variety of data and displayable objects, for example, text, alphanumeric data, photographs, and the like.

Data input to the device 100 may be performed via a variety of suitable means, such as, touch screen input via the display screen 105, keyboard or keypad input via a data entry area 110, key input via one or more selectable buttons or controls 115, voice input via a microphone 120 disposed on the device 100, photographic input via a camera 125 functionality associated with the communication device, or any other suitable input means. Data may be output via the device 100 via any suitable output means, including but not limited to, display on the display screen 105, audible output via an associated speaker 130 or connected earphone system, vibration module for providing tactile output, and the like.

Operational unit 135 is illustrative of internal operating functionality of the communication device 100. A processor 140 is illustrative of a general purpose computer processor for processing incoming and outgoing data and communications and controlling operation of the device and associated software applications via a communication device operating system. Memory 145 may be utilized for storing a device operating system, device programming, one or more stored applications, for example, mobile telephone applications, data processing applications, calculators, games, Internet browsing applications, navigation applications, acceleration applications, camera and/or video applications, a frequently called contacts application 140 (as will be described later in detail), etc. Communication device 100 may contain an accelerometer 155 for detecting acceleration, and can be used to sense orientation, vibration, and/or shock. Communication device 100 may contain a global positioning system (GPS) receiver 160, which when coupled with a navigation application, can pinpoint the device's 100 location, give directions to a provided destination, and may provide information about nearby businesses. Radio functions 150 include all required functionality, including onboard antennae, for allowing the device 100 to communicate with other communication devices and systems via a wireless network.

Although described herein in combination with communication device 100, in alternative embodiments the invention may be used in combination with any number of computer systems, such as in desktop environments, laptop or notebook computer systems, tablet computers, multiprocessor systems, micro-processor based or programmable consumer electronics, networked PCs, mini computers, main frame computers and the like. Embodiments of the present invention may be utilized in various distributed computing environments where computer executable tasks and process steps are performed by remote processing devices that are linked through a communications network in a distributed computing environment, and where programs may be located in both local and remote memory storage.

Computer executable tasks and process steps (as described below with reference to FIG. 3) performed in accordance with embodiments of the invention may be stored in and executed by a single computing device 100, or may be stored and performed across disparate computing devices for automatically generating a frequently called contacts list and for receiving, storing and maintaining favorite calling numbers lists. As will be described below, generation and maintenance of frequently called contacts lists and favorite calling numbers lists may be performed locally on a communication device 100, at a network-based call control center or billing system, on one or more other computing devices, or on combinations thereof. Embodiments of the invention, for example, may be implemented as a computer executed method or process, a computing system, or as an article of manufacture, such as a computer program product or computer-readable media. Embodiments of the invention may be implemented as computer executable instructions stored on one or more computer-readable media accessible and executable by one or more computing devices. Such computer-readable media may include any form of volatile or non-volatile memory readable by a computing device, including but not limited to, hard disks, floppy disks, CD-ROM, DVD, flash media, carrier waves on which executable instructions are carried, or any other form of computer-readable memory.

Figure 2A:
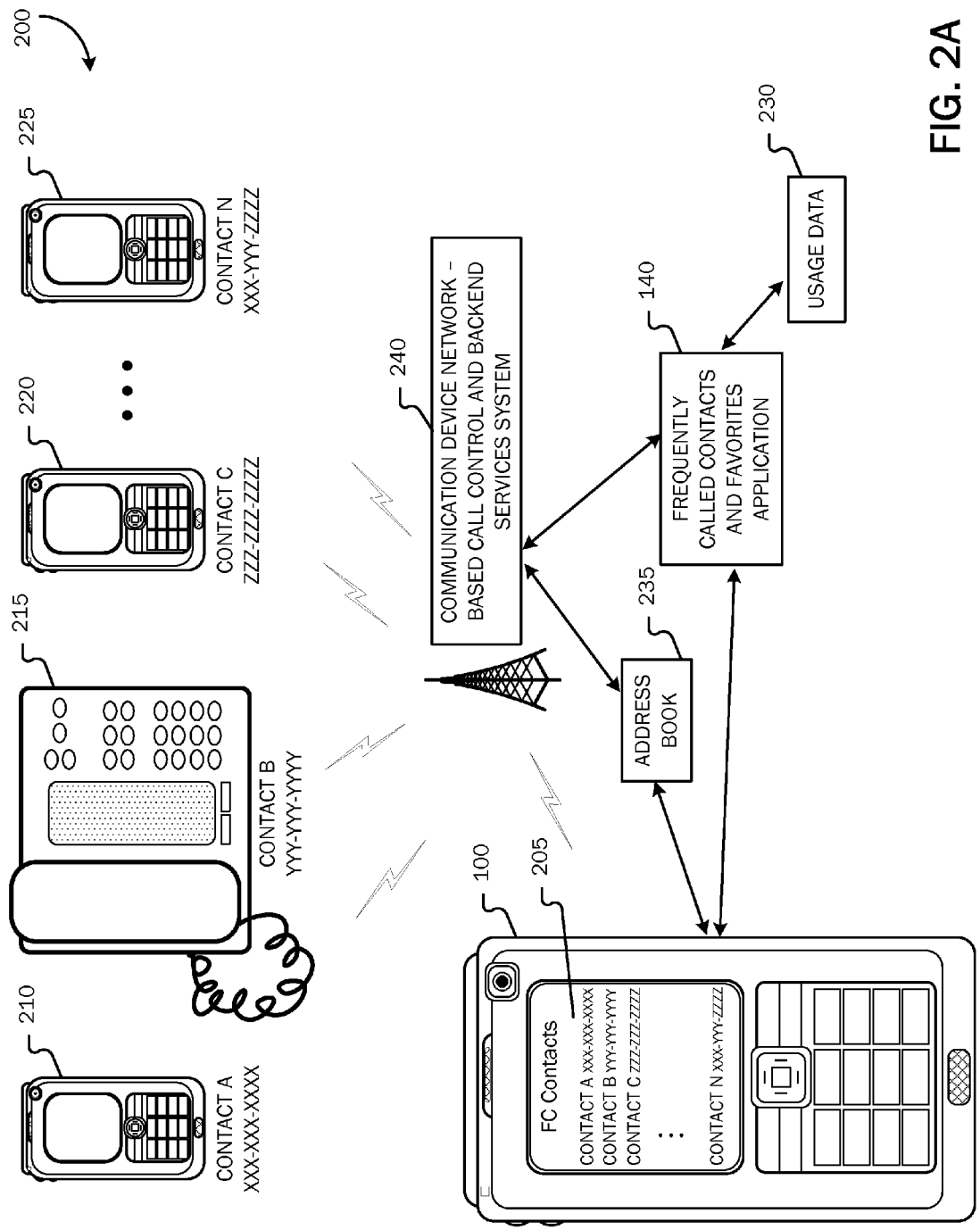
FIG. 2A is a simplified block diagram of a high-level system architecture with which embodiments of the invention may be implemented.

FIG. 2A is a simplified block diagram of an architecture for providing and managing a user's frequently called contacts and favorite calling numbers. According to one embodiment, a frequently called contacts list may be utilized as a speed dial feature, or as a billing feature. When used as a billing feature, minute or rate discounts may be applied to communications made to or received from numbers in a user's frequently called contacts list. Because the list may be automatically generated based on a user's calling patterns, the list may be dynamic, and may provide a useful, convenient, and money-saving tool for users. A set of frequently called contacts (e.g., for either billing purposes or for purposes of setting easy/fast dialing lists) may be determined algorithmically. For example a frequently called contacts list may be based on number of calls to particular number, minutes of calling to a particular number, calls made to a particular number during over a specified time (e.g., per day, per week, per month, etc.), and the frequently called contact list may be (most # of calls, most minutes of calling, or similar algorithms, etc. over a specified time period).

The frequently called contacts list may be updated and/or modified on a dynamic, periodic basis (e.g., daily, monthly, annually) based on these types of calling patterns. The calling intervals considered for the determination of the frequently called contacts list may be adaptable based on desires of the user. For example, individual users may create different types of frequently called contacts lists based on different calling intervals, for example, "frequently called people on weekdays", "frequently called people on Saturday nights for the past month", "frequently called people on Sundays over the past year", etc.

The computation of the frequently called contacts list may be done locally on the telephone 100 (e.g., as in the case of auto-configuration of dialers) via the frequently called contacts and favorite numbers (FCF) application 140, described below, or the computation may take place remotely, for example, at a network-based call control center or billing system center 240 via the FCF application 140 operated at the remote center 240. As should be appreciated, the center 240 may comprise a mobile telephone switching center for routing and controlling communications to and from the device 100, and the center 240 may include backend services of an associated mobile communications services provider, such as billing, accounting and services provision/maintenance. If the frequently called contacts list is maintained both locally and remotely, periodic communication may be performed between the local device and the remote network-based center for synchronizing the maintenance of the frequently called contacts list at both places. Access to and maintenance of the frequently called contacts list may also be performed remotely by a user, for example, via a web interface, telephonic interface, set-top box interface, and the like, with which the user may access the frequently called contacts list at a network-based center for making manual changes to the list.

According to an embodiment, the frequently called contacts and favorite calling numbers (FCF) application 140 may be provided for automatically managing a user's frequently called contacts 210,215,220,225. An FCF application 140 is a software application module operative to retrieve call usage data 230 associated with a called contact or contact address 210,215,220,225, to determine if the call usage associated with a called contact or contact address meets a prescribed threshold, and to create and manage a frequently called contacts list 205 based on retrieved usage data 230. As described below, the FCF application 140 is also operative to receive, store and cause updates to a favorite calling numbers list. The FCF application 140 may be operated locally at the device 100 or remotely at a network call control center and backend services (e.g., billing services) system 240. Communication between the device 100 and the center 240 may be performed on a periodic basis to share and synchronize frequently called contacts information and favorite calling number information between the device 100 and the center 240.

As should be appreciated, a contact address may contain the information necessary to identify an intended endpoint for a telephone call or other communication (e.g., text message), wherein the intended endpoint may be a landline phone, mobile phone, PDA, VOIP phone, set-top box, gaming device, computing device, etc. A contact address may be a landline telephone number, a mobile telephone number, a personal digital assistant number, an e-mail address, a fax number, an Internet Protocol (IP) address, a set-top box (STB) address, a Voice over Internet Protocol (VoIP) phone number, or an Instant Messaging (IM) address, etc.

According to one embodiment, a frequently called contacts list 205 may be a speed dial list, wherein contact names and/or contact addresses of contacts that a user calls most frequently are listed. The user may utilize this feature to access his/her frequently called contacts 210,215,220,225 quickly and easily. According to another embodiment, a frequently called contacts list 205 may be utilized as a feature for various service plans. For example, a service provider may allow calls to contacts in a user's frequently called contacts list 205 to be free of charge. As will be described below, an FCF application 140 may automatically generate a frequently called contacts list 205 based on a user's call usage.

Call usage data 230 associated with a called contact or contact address 210,215,220,225 may be comprised of such data as a usage count of the number of times a communication is made to or received from a particular contact or contact address. A usage count may be stored as a total number of times or amount of time (e.g., number of calling minutes) a communication is made to or received from a contact or contact address, and/or a number of times a communication is made to or received from a contact or contact address per unit time (e.g., per day, per week, per month, etc.). Usage count may also be stored based on when (e.g., day of week, time of day, etc.) communications are made for developing specialized frequently called contacts lists, such as "frequently called contacts called on Saturdays after 5:00 pm." A count of these types and frequencies of communications with a contact or contact address may be maintained by the FCF application 140. Call usage data 230 and/or an frequently called contacts list 205 may be stored, accessed and utilized locally on a communication device 100, or alternatively, the call usage data and/or frequently called contacts list may be stored on any number of storage media that may be accessed by the device via the radio 150 or via a wired connection between the device 100 and a separate computing device associated with the device, for example, a server computer in a distributed computing network.

As illustrated in FIG. 2A, a user may call various called parties (e.g., persons, businesses, etc.) using his/her communication device 100. The various called parties may be contacts or contact addresses in a user's address book 235 or contacts list, may be contacts or contact addresses in a user's frequently called contacts (FCC) list 205, or may be manually dialed phone numbers. Contact addresses may be phone numbers associated with mobile computing devices, landline phones, VOIP phones, computers, or various other communication devices. Based on a user's calling patterns, a frequently called contacts list 205 may be generated and fed into a billing system at the center 240. A notification may be provided to a user so that the user may accept or deny adding a contact to his/her frequently called contacts list 205.

According to embodiments, an electronic address book 235 may be provided for storing a user's contact names and contact addresses. The address book may be stored locally on the device 100, or may be located remotely at the center/system 240 and accessed by the device. According to an embodiment, the address book 235 may be a unified address book that may be available across various devices. A unified address book may maintain a database of contacts and may be accessed by various devices. For example, instead of a user having and maintaining a contacts list on his/her work computer, a contacts list on his/her mobile phone, and a contacts list on his/her home computer, he/she may have a unified contacts list that may be automatically synchronized and stored remotely in unified address book that may be accessed across his/her various devices. According to an embodiment, a frequently called contacts list 205 may be tied to a unified address book 235, wherein the frequently called contacts list may be a subset of the address book defined as frequently called contacts. Call usage data 230 may be comprised of call usage count data associated with one or more communication devices.

Figure 2B:
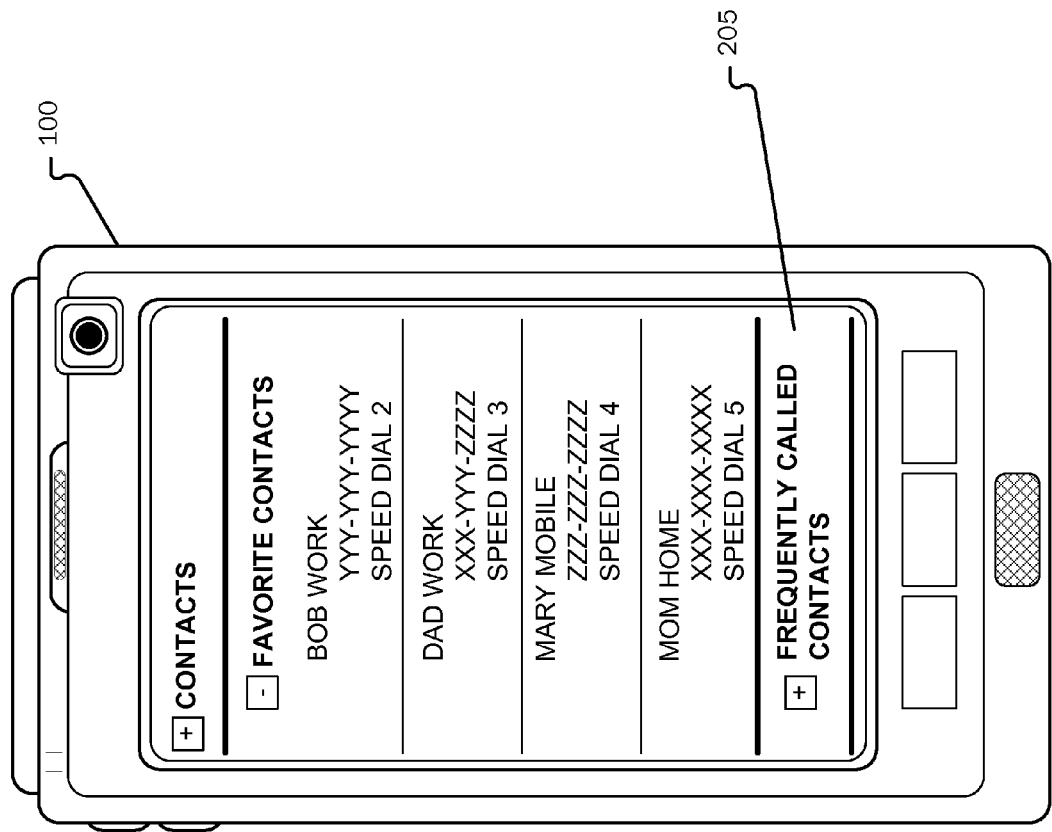
FIG. 2B is a simplified block diagram of a communication device user interface showing a display of a favorite calling numbers list and a frequently called contacts list according to embodiments of the invention.

According to another embodiment, a favorite calling numbers list may be generated which may contain frequently called contacts, or which may contain other numbers that are not called on a particular frequency, but that are otherwise important to the user. FIG. 2B is a simplified block diagram of a communication device 100 user interface showing a display of a favorite calling numbers list according to embodiments of the invention. The favorite calling numbers list may be a subset of a larger contacts list typically managed by the user (including the frequently called contacts list discussed above), and the favorite calling numbers list may be used and/or synchronized on a variety of platforms and places for a variety of actions. For example, the favorite calling numbers list may be used for setting a numeric speed dial list on the phone (e.g., press 1 to dial mom, press 2 to dial my work colleague, press 3 to dial particular social contact, etc.), for billing purposes such as free calling to the favorite contacts, for "click to call" purposes on a device operative to cause call setup (e.g., a cable services system set top box, and for a variety of other purposes.

As with the frequently called contacts list, described above, the favorite calling numbers list may be maintained locally on the local communication device 100 and/or remotely at a network-based call control or billing system center 240. If the favorite calling numbers list is maintained both locally and remotely, periodic communication may be performed between the local device 100 and the remote network-based center 240 for synchronizing the maintenance of the favorite calling numbers. Access to and maintenance of the favorite calling numbers list may also be performed remotely by a user, for example, via a web interface, telephonic interface, set-top box interface, and the like, with which the user may access the favorite calling numbers list at a network-based center for making manual changes to the list.

The favorite calling numbers list may be a subset of the above-described frequently called contacts list where the frequently called contacts list may be utilized to build the favorite calling numbers list either manually or automatically. For example, numbers added to the frequently called contacts list according to a given parameter, for example, numbers called daily for one week or more may be automatically grouped together to for a favorite calling numbers list or such numbers may be automatically added to a favorite calling numbers list. For automatic generation of a favorite calling numbers list, the FCF application 140 may be employed for capturing a subset of the contacts contained in the address book 235, including contacts in the frequently called contacts list according to a variety of parameters. For example, while contact information may be manually added to the favorite calling numbers list, the FCF application may be operative to capture information, for example, all calls made on Sundays, all calls made to a specific area code, and the like for generating a favorite calling numbers list apart from the frequently called contacts list.

Figure 3:
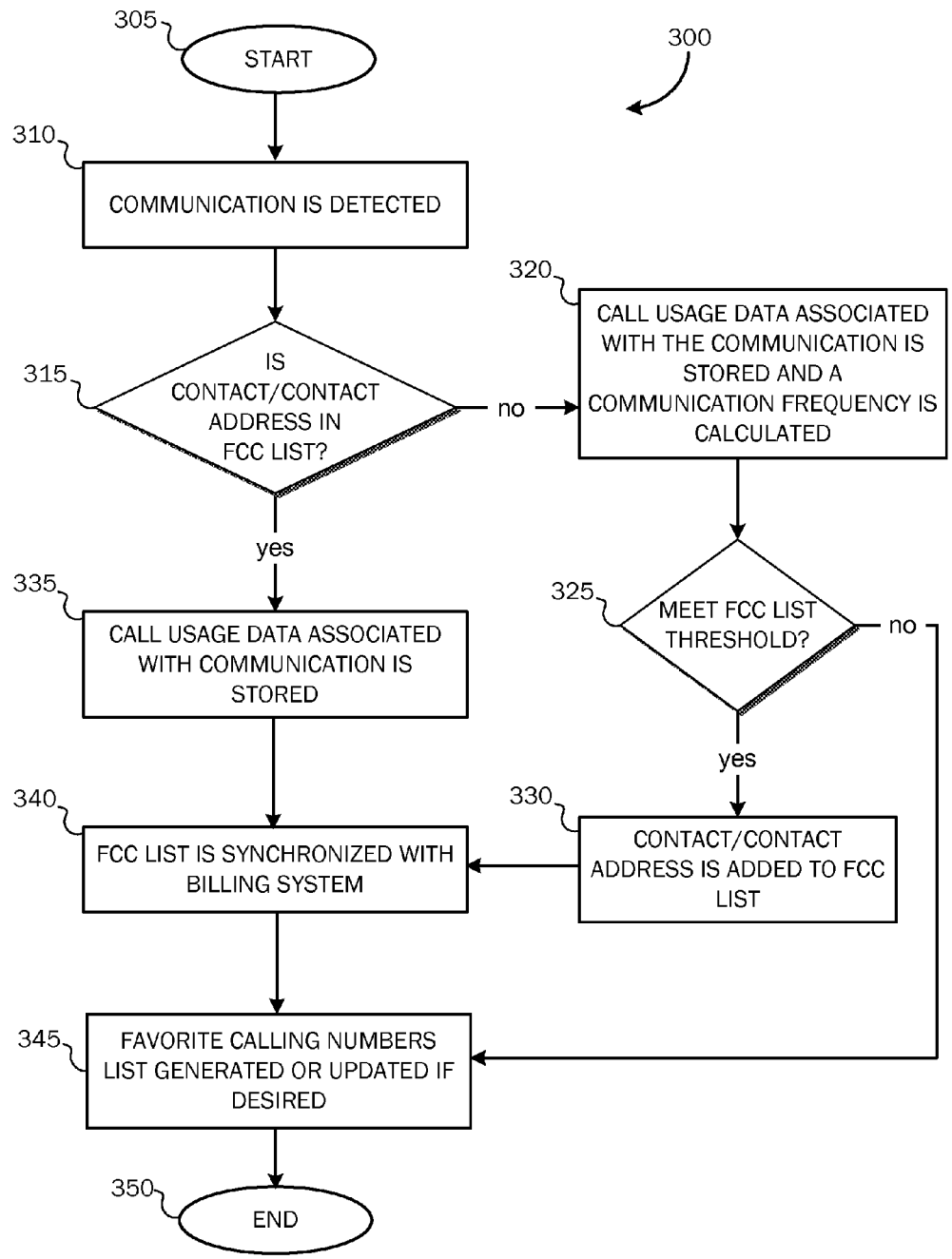
FIG. 3 illustrates a process flow diagram of a method for managing a user's frequently called contacts.

Having described elements of a mobile computing architecture that may serve as an exemplary operating environment for embodiments of the present invention, FIG. 3 illustrates an example process flow of generating and managing frequently called contacts and for generating and managing a favorite calling numbers list. The method starts at OPERATION 305 and proceeds to OPERATION 310 where a communication is detected. A communication may be a phone call received or initiated by manually dialing a phone number associated with a communication device (e.g., a phone number of a landline phone, mobile phone, PDA, IP address of a VOIP phone, computer, etc.), by selecting a contact address or number from a contacts list or address book, by selecting a shortcut key associated with a contact or contact address, or by other various ways as is known in the art. A communication may be a text message, instant message, or other type of communication sent to or received by the communication device 100.

The method proceeds to DECISION OPERATION 315 where a determination is made as to whether the contact name and/or address is/are in a frequently called contacts list 205. As described above, a contact address may be a landline telephone number, a mobile telephone number, a personal digital assistant number, an e-mail address, a fax number, an Internet Protocol (IP) address, a set-top box (STB) address, a Voice over Internet Protocol (VoIP) phone number, or an Instant Messaging (IM) address. A frequently called contacts list 205 may be a list of contact names and/or one or more contact addresses of communication devices associated with contacts that a user may call most frequently. A maximum number of contacts or contact addresses in a frequently called contacts list may be determined by a service provider. Various service providers may offer various features and/or plans for a user's frequently called contacts. For example, a service provider may allow a user to call or receive calls (or other communications) from frequently called contacts for free or without using minutes on his/her service plan.

If the called number/contact is not in a user's frequently called contacts list 205, the method proceeds to OPERATION 320, where call usage data 230 associated with the communication to the contact name/address is stored either locally at the device 100 or remotely at the center/system 240. A communication frequency may be calculated using stored call usage data. A usage counter may store usage data 230, such as how many times a communication have been made with a particular contact address, how many times a communication has been made with a particular contact address per unit time, etc.

The method proceeds to DECISION OPERATION 325, where a determination is made as to whether the communication frequency or type (e.g., all calls made on Sundays) associated with the called contact/address meets a frequently called contacts list threshold after the counter has been incremented at OPERATION 320. A frequently called contacts list threshold may be the usage count of the least communicated with contact address within the frequently called contacts list 205. That is, before the communication was detected, the contact address associated with the communication was not in the user's frequently called contacts list 205. After the communication was detected, a usage count of the number of times the number/contact has been called (i.e., communication frequency) is incremented by one.

After this usage count increment, at DECISION OPERATION 325, a determination is made as to whether the usage count/communication frequency of the called contact address now exceeds the usage count associated with a contact address of the least called contact address in the frequently called contacts list 205. As should be appreciated, the threshold may be based on how many contacts/contact addresses may be included in the frequently called contacts list 205 as determined by a service provider.

According to an embodiment, a user may preserve one or more frequently called contacts. For example, a user may call a specific contact infrequently over a specific time period, and according to usage data 230, another contact may meet a threshold to be included on his/her frequently called contacts list 205. However, the specific contact may be a number that he/she wants to keep on his/her frequently called contacts list 205. An option may be provided for a user to override an automatic frequently called contacts list deletion or insertion.

If the usage count/communication frequency of the contact address meets the frequently called contacts list threshold, at OPERATION 330, contact data associated with the communication device may be added to the user's frequently called contacts list 205. The frequently called contacts list 205 may be synchronized with the user's address book either locally at the device 100 or remotely at the center/system 240. According to an embodiment, a notification may be provided to the user, allowing the user to choose whether or not to add the contact address to his/her frequently called contacts list 205.

If the called contact/contact address is in the user's frequently called contacts list 205 at DECISION OPERATION 315, the method proceeds to OPERATION 335, where a usage counter associated with the contact/contact address is incremented. After the usage counter is incremented at OPERATION 335 or after the called contact/contact address is added to the frequently called contacts list 205 at OPERATION 330, the method proceeds to OPERATION 340, where the frequently called contacts list 205 is synchronized with a service provider billing system. When a frequently called contacts list 205 is tied to a billing system, features, such as preferential or contractually determined calling rates, may be applied to a user's frequently called contacts. As should be appreciated, automatic generation and updating of the frequently called contacts list 205, as described herein, may be performed constantly based on changing usage count data, or generation and updating of the list 205 may be done according to prescribed intervals, such as daily, weekly, monthly, when the billing system processes bills for the device 100, and the like.

Referring still to FIG. 3, at OPERATION 345, the favorite calling numbers list may be created manually by a user of the device 100, or the favorite calling numbers list may be created and/or updated automatically by the FCF application 140 as described above with respect to FIGS. 2A and 2B. The method ends at OPERATION 350.

As described herein, automatically generating and maintaining a frequently called contacts list and a favorite calling numbers list is provided. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for managing frequently called contacts and favorite calling numbers, the method comprising:
    detecting a communication of a first communication device with a second communication device;
    storing call usage data for the communication of the first communication device with the second communication device;
    calculating a communication frequency with the second communication device utilizing stored call usage data;
    determining if the communication frequency with the second communication device meets a threshold for inclusion in a frequently called contacts list; and
    if it is determined that the communication frequency with the second communication device meets the threshold for inclusion in a frequently called contacts list associated with the first communication device, automatically storing contact data associated with the second communication device in a frequently called contacts list associated with the first communication device, calls placed to contacts of the frequently called contacts list associated with a discounted rate.

2. The method of claim 1, prior to determining if the communication frequency with the second communication device meets a threshold for inclusion in a frequently called contacts list, further comprising:
    determining if a contact address associated with the second communication device is stored in a frequently called contacts list associated with the first communication device; and
    if it is determined that the contact address associated with the second communication device is not stored in a frequently called contacts list associated with the first communication device, determining if the communication frequency with the second communication device meets a threshold for inclusion in a frequently called contacts list.

3. The method of claim 1, wherein a contact address includes one or more of a landline telephone number, a mobile telephone number, a personal digital assistant number, an e-mail address, a fax number, an Internet Protocol (IP) address, a set-top box (STB) address, a Voice over Internet Protocol (VoIP) phone number, or an Instant Messaging (IM) address.

4. The method of claim 1, wherein automatically storing contact data associated with the second communication device in a frequently called contacts list associated with the first communication device includes automatically storing contact data associated with the second communication device in a unified electronic address book, wherein the unified electronic address book is a network-based database containing one or more contact names and one or more contact addresses associated with each one or more contact names, and operative to comprise a frequently called contacts list.

5. The method of claim 1, further comprising providing an option for a user of the first communication device to accept or decline storing contact data associated with the second communication device in a frequently called contacts list associated with the first communication device.

6. The method of claim 1, wherein if a predetermined maximum number of frequently called contacts allowed for a frequently called contacts list is reached, and if it is determined that the communication frequency with the second communication device meets the threshold for inclusion in a frequently called contacts list associated with the first communication device, providing an option for a user of the first communication device to accept or decline replacing contact data associated with a frequently called contacts list item with contact data associated with the second communication device.

7. The method of claim 1, further comprising associating the frequently called contacts list with a service provider billing system.

8. The method of claim 1, wherein a communication of a first communication device with second communication device is a phone call.

9. The method of claim 1, wherein call usage data comprises a call usage count.

10. The method of claim 1, wherein storing call usage data for the communication of the first communication device with the second communication device includes storing data as to one or more of when a communication of the first communication device with the second communication device is made, a duration of the communication of the first communication device with the second communication device, or a frequency with which communications of the first communication device with the second communication occur.

11. The method of claim 1, further comprising:
    determining whether the contact data associated with the second communication device meets a criteria for inclusion into a favorite calling numbers list; and if the contact data associated with the second communication device meets a criteria for inclusion into a favorite calling numbers list, adding the contact data associated with the second communication device to the favorite calling numbers list.

12. The method of claim 1, further comprising automatically adding a subset of contact data stored in a frequently called contacts list associated with the first communication device to a favorite calling numbers list associated with the first communication device where the subset of contact data stored in the frequently called contacts list meets a criteria for inclusion into the favorite calling numbers list.

13. A system for managing frequently called contacts and favorite calling numbers, the system comprising:
- a frequently called contacts and favorite calling numbers application operative:
  - to detect a communication of a first communication device with a second communication device;
  - to store call usage data for the communication of the first communication device with the second communication device;
  - to calculate a communication frequency with the second communication device utilizing stored call usage data;
  - to determine if a phone number associated with the second communication device is stored in a frequently called contacts list associated with the first communication device;
  - to determine if the communication frequency with the second communication device meets a threshold for inclusion in a frequently called contacts list if it is determined that the phone number associated with the second communication device is not stored in a frequently called contacts list associated with the first communication device; and
  - to automatically store contact data associated with the second communication device in a frequently called contacts list associated with the first communication device if it is determined that the communication frequency with the second communication device meets the threshold for inclusion in a frequently called contacts list associated with the first communication device, calls placed to contacts of the frequently called contacts list receiving a discounted rate.

14. The system of claim 13, wherein the frequently called contacts and favorite calling numbers application is further operative to store call usage data for the communication of the first communication device with the second communication device including storing data as to one or more of when a communication of the first communication device with the second communication device is made, a duration of the communication of the first communication device with the second communication device, or a frequency with which communications of the first communication device with the second communication occur.

15. The system of claim 13, wherein the frequently called contacts and favorite calling numbers application is further operative to determine whether the contact data associated with the second communication device meets a criteria for inclusion into a favorite calling numbers list; and if the contact data associated with the second communication device meets a criteria for inclusion into a favorite calling numbers list, to add the contact data associated with the second communication device to the favorite calling numbers list.

16. The system of claim 13, wherein the frequently called contacts and favorite calling numbers application is further operative to add a subset of contact data stored in a frequently called contacts list associated with the first communication device to a favorite calling numbers list associated with the first communication device where the subset of contact data stored in the frequently called contacts list meets a criteria for inclusion into the favorite calling numbers list.

17. The system of claim 13, wherein a contact address includes one or more of a landline telephone number, a mobile telephone number, a personal digital assistant number, an e-mail address, a fax number, an Internet Protocol (IP) address, a set-top box (STB) address, a Voice over Internet Protocol (VoIP) phone number, or an Instant Messaging (IM) address.

18. The system of claim 13, further comprising a unified electronic address book for receiving contact data associated with the second communication device in a frequently called contacts list associated with the first communication device, wherein the unified electronic address book is a network-based database containing one or more contact names and one or more contact addresses associated with each one or more contact names, and operative to comprise a frequently called contacts list.

19. A non-transitory computer readable medium having computer executable instructions which when executed by a computer perform a method for managing frequently called contacts, the method comprising:
- detecting a communication of a first communication device with a second communication device;
- storing call usage data for the communication of the first communication device with the second communication device;
- calculating a communication frequency with the second communication device utilizing stored call usage data;
- determining if a contact address associated with the second communication device is stored in a frequently called contacts list associated with the first communication device;
- if it is determined that the contact address associated with the second communication device is not stored in a frequently called contacts list associated with the first communication device, determining if the communication frequency with the second communication device meets a threshold for inclusion in a frequently called contacts list;
- if it is determined that the communication frequency with the second communication device meets the threshold for inclusion in a frequently called contacts list associated with the first communication device, automatically storing contact data associated with the second communication device in a frequently called contacts list associated with the first communication device; and
- determining whether the contact data associated with the second communication device meets a criteria for inclusion into a favorite calling numbers list; and
  - if the contact data associated with the second communication device meets a criteria for inclusion into a favorite calling numbers list, adding the contact data associated with the second communication device to the favorite calling numbers list, calls placed to numbers of the frequently called numbers list receiving a discounted rate.

20. The computer readable medium of claim 19, further comprising a unified electronic address book, wherein the unified electronic address book is a network-based database containing one or more contact names and one or more contact addresses associated with each one or more contact names, and operative to comprise a frequently called contacts list.

* * * * *